PROCESS FOR PRODUCING POTASSIUM SUPEROXIDE

Satoshi Takahashi, Tokyo, Japan, assignor to Fire Research Institute, Fire Defence Agency, Ministry of Home Affairs, Tokyo, Japan
No Drawing. Filed Feb. 11, 1972, Ser. No. 225,637
Claims priority, application Japan, Feb. 22, 1971, 46/7,999
Int. Cl. C01b 13/00, 15/00
U.S. Cl. 423—581     5 Claims

ABSTRACT OF THE DISCLOSURE

Potassium hydroxide and a concentrated aqueous hydrogen peroxide solution are mixed under high vacuum the compounds forming potassium peroxide-hydrogen peroxide $K_2O_2 \cdot 2H_2O_2$ which is heat-dried and then dehydrated at an elevated temperature to form potassium superoxide $KO_2$.

SPECIFICATION

This invention relates generally to manufacturing of potassium superoxide and more specifically to a wet process for producing the superoxide.

The potassium superoxide has found significant value as a relatively rich source of oxygen for breathing apparatuses and for restricted atmospheric areas such as submarines. This compound can be utilized as a solid state storage medium for oxygen and as absorbent of carbon dioxide. Presently such higher oxide is being considered for use as an oxygen supply and carbon dioxide absorbent in manned space vehicles.

Potassium superoxide has in the past been produced by the combustion of pure potassium peroxide in oxygen. Such processes involve the use of pure potassium peroxide and thereby suffer from the attendant problem factors of cost, handling and storage of the material. U.S. Pat. No. 2,648,596 issued to Schechter is cited. An example of an attempt to circumvent the problems of the prior art is found in the chemical procedural approach disclosed in U.S. Pat. No. 2,908,552 issued to Cunningham. Recently, in U.S. Pat. 3,120,997 a wet process was disclosed by which potassium superoxide from potassium hydroxide KOH and concentrated hydrogen peroxide $H_2O_2$ can be synthetized. Further, the following year in the French Pat. 1,460,714, a process for synthetizing potassium superoxide by employing halogenated hydrocarbons as reaction buffers and cooling accelerators during mixing and subsequently pyrolizing the obtained mixture under atmospheric pressure, was disclosed. However, the synthesis disclosed in said French patent does not lead to the quality standard obtainable by the process disclosed in said U.S. patent in purity of the product obtained, and moreover the mixing of KOH and hydrogen peroxide solution, even when carried out under carefully controlled cooling conditions, sometimes leads to rapid decomposition due to the floating on the surface of the mixture of halogenated hydrocarbons. Such decomposition often causes an ignition of the system, and the damage of such an accident becomes serious in production on commercial scale because of the evolved heat accumulated in the system.

The exothermic reaction during mixing is represented by the following equations:

Hydration

$$KOH + H_2O(1) \rightarrow KOHaq + 12.9 \text{ Kcal.} \quad (1)$$

Neutralization

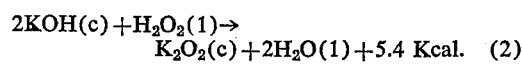
$$2KOH(c) + H_2O_2(1) \rightarrow K_2O_2(c) + 2H_2O(1) + 5.4 \text{ Kcal.} \quad (2)$$

Decomposition

$$K_2O_2(c) + H_2O(1) \rightarrow 2KOH(c) + 43.7 \text{ Kcal.} \quad (3)$$

Thus the separation of the product mixture from halogenated hydrocarbons requires a time-consuming cumbersome operation, always facing the danger of ignition by sudden decomposition.

While the process taught by the above-mentioned U.S. patent not only requires a carefully controlled cooling process in order to cope with the vigorous exothermic reaction according to the Equations 1 and 2 it must also often meet the cooling demand caused by decomposition heat accumulated in the system according to the Equation 3.

Furthermore, the product obtained by such known processes, even when subjected to vacuum distillation, cannot be evaporated because of the self-cooling property at evaporation and requires a considerably long period to reach complete dryness and the decomposition according to the Equation 3 often takes place thereby lowering the purity of the product obtained.

It is the primary object of this invention to provide an improved and simplified process for producing potassium superoxide.

A specific object of this invention is to provide an improved and an economical process for producing potassium superoxide.

A further object of this invention is to provide a process for producing potassium superoxide from readily available materials under reasonable production conditions.

Another object of this invention is to provide a process for obtaining potassium superoxide from a reaction mixture obtained by directly mixing solid potassium hydroxide with hydrogen peroxide.

Still another object of the present invention is to provide a novel industrial process free from the dangerous operations and hazards mentioned above.

With the foregoing and other objects in view, the invention resides in the following specification and appended claims.

According to the process of the present invention potassium hydroxide and concentrated hydrogen peroxide are mixed and reacted in a vessel under a highly reduced pressure.

More specifically according to the present invention, particles or paste of potassium hydroxide are placed in a reaction container positioned on a heater in the vacuum vessel eventually employed, and hydrogen peroxide solution is introduced into said reaction container at a low flow rate by aspiration from an outside reservoir through a pipe equipped with a control valve.

Though a significant amount of heat is generated in the reaction container due to vigorous exothermic reactions according to the Equations 1 and 2, said heat is immediately dissipated from the system as the latent heat} of evaporation of excessive water originally present in hydrogen peroxide and water generated by the reaction between potassium hydroxide and hydrogen peroxide, since the reaction system is constantly kept under highly reduced pressure. Consequently the mixture in the reaction container can be kept constantly at a temperature below a critical temperature which would trigger off the decomposition according to the Equation 3.

These differences are schematically shown in the following flow-chart:

Conventional process:

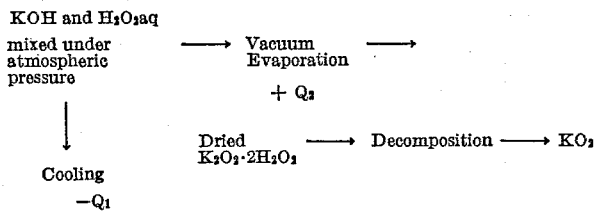

Process of this invention:

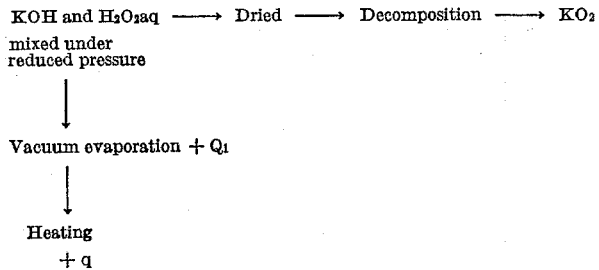

The use of hydrogen peroxide solution of unnecessarily high concentration will elevate the reaction temperature, accelerating the decomposition rate according to the Equation 3 and thus lowering the purity of $KO_2$. Consequently in case of hydrogen peroxide solution of high concentration it is recommended to make a paste of KOH particles with water of necessary amount comparable to that calculated from the thermodynamic Equation 1 in order to obtain a high purity of $KO_2$. Also in case of using hydrogen peroxide and KOH particles alone instead of KOH paste, it is preferable to keep the concentration of hydrogen peroxide solution within the range of 40–80%.

According to the process of the present invention the effective utilization of the heat of hydration resulting from the Equation 1 and the heat of neutralization resulting from the Equation 2 for eliminating the water contained in the hydrogen peroxide solution and generated from the reaction 2 can be attained and it is usually unnecessary to supply heat to the heater for drying.

The dried product is decomposed, by means of heating with a small rod heater previously inserted into said reaction container, according to the following equation to obtain the desired product $KO_2$:

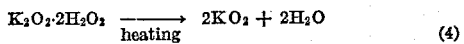

The embodiments of this invention will be explained more in detail by the following examples.

EXAMPLE 1

30 gr. of potassium hydroxide, G.R. grade, was mixed with 10 ml. of water to make a paste, which was placed in a desiccator of 50 l. capacity maintained at a pressure of 5 mm. Hg by means of vacuum pump.

To this paste was added 34 ml. of 90% $H_2O_2$ solution dropwise over a period of ca. 30 minutes from a dropping funnel placed outside said desiccator through a thin glass tube. When the boiling and evaporation did not become vigorous, the mixture was maintained at a temperature not exceeding 50° C. by the heater until the drying was completed. When the drying was visually confirmed to be complete, the decomposition was initiated by local heating with said heater to obtain yellow $KO_2$.

Time required: 1 hr; Purity: 85%.

EXAMPLE 2

48 ml. of 55% $H_2O_2$ solution was introduced to 30 gr. of granular KOH, G.R. grade, similarly to the Example 1. After drying the product was maintained at 60° C. and locally heated by the heater thereby initiating rapid decomposition to obtain $KO_2$.

Time required: 55 minutes; Purity: 89%

EXAMPLE 3

30 ml. of 90% $H_2O_2$ solution was introduced to 30 gr. of granular KOH and the succeeding operations were carried out similarly to those in the Example 2.

Time required: 50 minutes; Purity: 86%

As is understood from the preceding description and examples, the advantages of the process according to the present invention are:

(1) shortened reaction time due to simplified process,
(2) economization in labor due to simplified process,
(3) elimination of coolant and associated equipment to avoid an explosion and
(4) improvement in the reliability of the process and the product purity.

Thus the process according to this invention is highly economical compared with the conventional process in consideration of time, equipment and labor being economized to less than half.

What is claimed is:

1. A process for producing potassium superoxide which comprises mixing and reacting a member selected from the group consisting of granular potassium hydroxide and an aqueous paste of potassium hydroxide with a concentrated aqueous solution of hydrogen peroxide under a high vacuum on the order of 5 mm. Hg, heating the reaction product to dryness at a temperature up to 50° C. and decomposing the thus obtained $K_2O_2 \cdot 2H_2O_2$ at an elevated temperature higher than 50° C. to about 60° C. whereby potassium superoxide $KO_2$ is obtained.

2. A process for producing potassium superoxide $KO_2$ comprising the steps of placing potassium hydroxide in a reaction container, subjecting said potassium hydroxide to high vacuum of the order of 5 mm. Hg, adding an aqueous solution of hydrogen peroxide through a measuring tube to said reaction container for reaction with the potassium hydroxide, the reaction producing evaporation of water contained in said aqueous solution and evaporation of water which is formed during the reaction, said evaporations holding the reaction temperature below a decomposition temperature that would trigger off the decomposition of $K_2O_2$ with liquid hydrogen peroxide, heat-drying the reaction product at a temperature up to 50° C. and decomposing said reaction product at an elevated temperature higher than 50° C. to about 60° C., whereby potassium superoxide $KO_2$ is obtained.

3. A process according to claim 1, wherein the potassium hydroxide is in the form of an aqueous paste, the aqueous solution of hydrogen peroxide is a 90% solution of hydrogen peroxide, and the reaction temperature is kept at a temperature up to 50° C. by an outside source of heat.

4. A process according to claim 1, wherein the potassium hydroxide is in granular form, the hydrogen peroxide is an aqueous solution containing 55% hydrogen peroxide, and the decomposing to form potassium superoxide takes place at a temperature of 60° C.

5. A process according to claim 1, wherein the potassium hydroxide is in granular form, the hydrogen peroxide is an aqueous solution containing 90% hydrogen peroxide, and the decomposing to form potassium superoxide takes place at a temperature of about 60° C.

References Cited

Mel'nikov et al., "Reaction of Hydrogen Peroxide Vapor With Alkali and Alkaline Earth Metal Hydroxides," Russ. J. Inorg. Chem. (Engl.), 8 #3, pp. 284–6, 1963.

Maass et al., "Properties of Pure Hydrogen Peroxide V. Vapor Pressure," J.A.C.S. 46, pp. 2693–700 (1924).

Chemical Abstracts, vol. 58, June 1963, p. 12157.

A Mel'nikov et al., Zh. Neorgan. Khim., vol. 8; pp. 560–562 (1963).

OSCAR R. VERTIZ, Primary Examiner

B. E. HEARN, Assistant Examiner

U.S. Cl. X.R.

423—582